United States Patent Office 2,749,965
Patented June 12, 1956

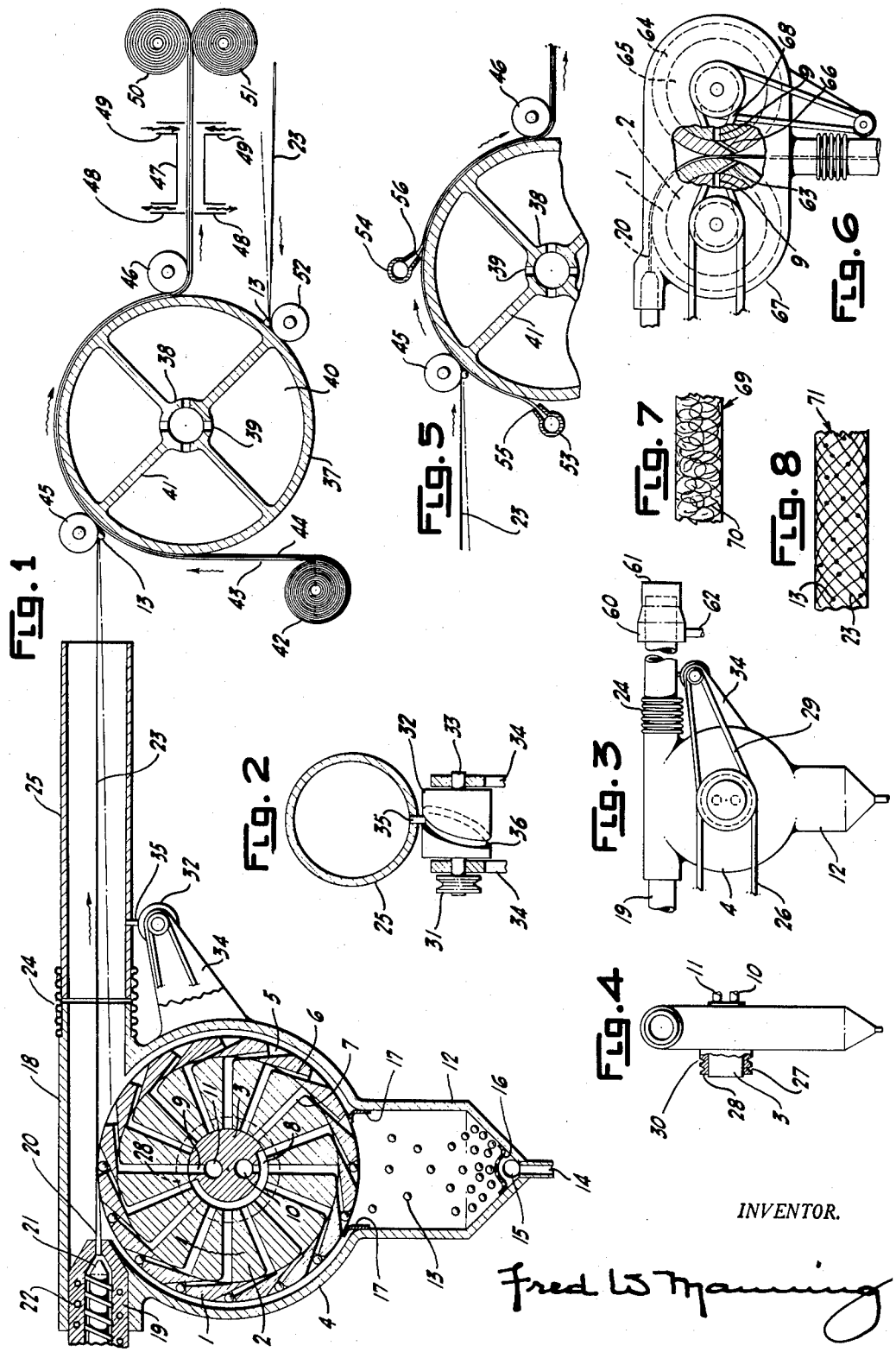

2,749,965
FILAMENTARY REINFORCEMENTS
Fred W. Manning, Palo Alto, Calif.

Application July 20, 1954, Serial No. 444,510

14 Claims. (Cl. 154—1)

My invention relates to laminated fabrics, and particularly to methods, apparatus, and materials for reinforcing foils, films, tapes, paper, cloths, roofing, and other sheeting materials. This application is a continuation-in-part of my copending application, Serial No. 185,240, filed September 16, 1950 (subsequently issued as Patent No. 2,687,363), which in turn was a continuation-in-part of my application, Serial No. 742,247, filed April 18, 1947, now abandoned in favor of the said former copending application. Other improvements in the present invention are disclosed in my Patent No. 2,713,001.

Heretofore films were made from such thermoplastics as polyethylene, polyvinyl chloride, vinyl chloride-acetate copolymers, vinylidene chloride, rubber hydrochloride, ethyl cellulose, regenerated cellulose, polystyrene, polyamide, polyvinyl alcohol, and mixtures and derivatives thereof. All lacked uniform tear strength. Their molecular orientation crosswise and lengthwise was seldom the same; all were distortionally and dimensionally unstable and consequently could only be used where little strength was required. However, all were also sealable by heat and low pressures (high frequency heat sealing being preferable for some), and consequently can readily be bonded to filamentary webs of great strength.

Pressure-sensitive tapes were usually made from thermoplastic films, such as polyethylene, vinyl and polyester films, etc. coated with adhesives, such as an elastomer in mixture with a resin of which mixtures there are hundreds of formulations. Nearly all varied in thickness between one and twenty mils, and few had a tensile strength over 50 lbs. per inch of width. Similar lack of strength existed in other types of tapes.

Aluminum foils usually varied in thickness between .005 inch and .00025 inch. Such foils lacked strength and easily ruptured during manufacture, and could be used for the packaging of foods but once and then had to be discarded. Sometimes a foil was given a coating of cellulose acetate, polyvinylidene chloride, or other thermoplastic material, which being distortionally unstable added little to the strength of the foil. This lack of strength was also true of foils produced from other metals.

Roofing was usually made from a paper or felt impregnated with a bituminous saturant and coated with fine gravel. The weight was excessive (sometimes as much as 100 pounds for a roll to cover 100 sq. ft.), it had little tear strength, and had to be factory made and freighted around before application.

All such films, tapes, foils, roofing, etc. have a low degree of porosity and are therefore considered hereinafter as being impervious.

It is therefore an object of this invention to provide a method and means to reinforce films, foils, tapes, paper, cloth, roofing, and like materials with stretch-oriented filaments distributed therein or thereover in a substantially uniform manner so that the tear strength is materially increased and substantially uniform in all directions. Another object of the invention is to stretch-orient the reinforcing filaments by propulsion of discrete adherent pulling solids, and then to use the solids to bind the filaments to the sheeting to be reinforced.

Still another object is to distribute uniformly pulling pellets or discrete solids of predetermined size and spacing over a web to be reinforced so that when the said solids are subjected to predetermined heat and pressure the solids will readily thin out to form adhesive spots, patches, or a continuous coating, of any predetermined thickness. The latter may have a depth equivalent to the thickness of the filaments; it may partly or completely fill the interstices of a web of filaments; or it may exceed the said depth and completely inclose the filaments.

A further object is to accomplish the bonding of stretch-oriented filaments to sheeting by heat and pressure without loss of stretch-orientation to the filaments.

An additional object is to strengthen sheeting by filamentary reinforcement instead of by coating, and thereby greatly reduce the expense for the plastic required.

A still further object is to propel filament pulling pellets centrally through the stretching barrel in a line substantially tangential with the peripheral movement of a filament-pellet contacting rotor, and at the same time constantly redirect the movement of the barrel so that a sheet is reinforced with great uniformity.

And still another object is to regulate the stretch of the reinforcing filaments so that a distortionally unstable film shall be given a predetermined extensibility in any or all directions.

In accordance with one aspect of my invention, the reinforcing fibre-forming material is forced or flows from an extrusion device or melting furnace in finely divided streams onto the periphery of a rotor which is preferably coated with an antiadhesive, such as polytetrafluoroethylene. The movement of the rotor brings discrete solids held in the pockets of its peripheral wall into adherent contact with the fire-forming streams. The latter are then preferably pulled a predetermined distance and attenuated into filaments before the solids are blasted from the pockets through a stretching and directing barrel.

The fibre-forming streams are in an adhesive condition at the time contact is made with the discrete solids. The temperature and force of the propulsion fluid are such that the solids, upon being propelled from the rotor, attenuate the comparatively short length adhesive filaments into filaments of substantial length and strength compared with filaments normally produced by force of elastic fluid streams without the aid of pulling solids.

The filaments may be 12 inches in length for a short length barrel and a close-up depositing surface, or they may be many feet in length for the usual length of barrel, or they may be continuous. The propulsion fluid temperature may be atmospheric for cold-drawn filaments, or it may be the adhesive temperature of the filaments if the latter are to be deposited in an adhesive condition. The propelling fluid pressure may be the few ounces per square inch in an ordinary blowing machine, or it may be 50 to 100 lbs. or more per square inch when the solids are to be propelled great distances, as when a web is to be spun over a fruit tree.

Stretch-orientation of a filament ordinarily commences at the moment a filament can be sufficiently tensioned to assume a substantially straight line between horizontal holding and pulling means without the aid of support between the two said means. This may be at the moment it leaves the extrusion device, and for sometime thereafter the filament may continue to be in a plastic and an adhesive condition, as indicated by the distance usually maintained between a spinneret and the first wind-up bobbin to prevent sticking of adjacent filaments; and so long as a filament is maintained in this plastic and adhesive condition, or is attached to a source of supply in this plastic and adhesive condition, the filament or source of supply may be drawn out indefinitely. However, once the filament has become set, additional stretching will usually bring it to its initial point of elasticity, and from there until its elastic limit has been reached it may be truly elastic, returning to its initial point of elasticity when the stretching force has been removed.

Therefore, if the entire length of a filament is cold-drawn between a pulling pellet and a succeeding pellet and its elastic limit has been reached, the filament will usually break at the succeeding pellet; if the inner end of a filament remains adhesively connected to a succeeding pellet, or the former has not reached its elastic limit, the pellet can be shot from the rotor without any breakage in the filament, thus producing a continuous filament with adherent pellets spaced at regular intervals along its length. In other words, propulsion temperatures, pressures and distances can be so regulated that a discontinuous filament can be produced if cold-drawn by a pellet beyond its maximum strength and elastic limit; a continuous filament can be produced if stretched by a pellet within its maximum strength and elastic limit.

To prevent adherence to the gun barrel of filaments or pellets during propulsion, the pellets are shot centrally through the barrel in a line that is tangential to the peripheral movement of the rotor. The inside of the barrel may also be coated with an antiadhesive, such as polytetrafluoroethylene. This will normally prevent adherence. However, if because of high temperature and/or pressure a finely divided portion of fibre-forming material is disrupted into a multitude of adhesive filaments and the filaments dispersed sufficiently to contact the sides of a barrel before exit therefrom, the barrel should be shortened as much as is necessary and an ejector placed thereover. The propulsion of an annular column of higher pressure fluid through the ejector barrel will prevent adherence of filaments or pellets to either barrel. Obviously, the length of the barrels will vary within wide limits depending mostly upon their diameters which will be determined from the volume of pellets to be shot simultaneously therethrough.

The barrel of the spinning gun and/or ejector, moves back and forth during the spinning operation to give uniformity to the spacing of the filaments, which preferably are deposited in a stretch-oriented condition and bonded to the sheet being reinforced without loss of that stretch-orientation. The substantial length of the filaments also adds to the strength of the reinforcement.

To accomplish the bonding without loss of stretch-orientation, the pulling solids are thermoplastic having an adhesive temperature below the softening point of the filaments, and at the said adhesive temperature and by pressure the solids are used to bond the filaments to the sheet being reinforced. Or the pellets may be exploded, evaporated, or disintegrated on impact, to separate them from the filaments, and heat and pressure used to reduce either filaments or sheet to be reinforced to an adhesive condition, and the bonding accomplished as indicated. Or filaments or sheet may be coated with an adhesive or a solvent before being brought together, and heat and/or pressure used to aid the bonding. However, a stronger reinforcement will always result if the bonding is accomplished below the softening point of the reinforcing filaments.

The invention is exemplified in the following description, and a preferred arrangement is illustrated by way of example in the accompanying drawings, in which:

Fig. 1 is a vertical section of the spinning and reinforcing apparatus.

Fig. 2 is a view, partly in cross-section and partly in elevation, showing how the gun barrel may be reciprocated.

Fig. 3 is a small scale elevation view of the spinning gun.

Fig. 4 is a small scale end view of the spinning gun.

Fig. 5 is a vertical section of a modification of the reinforcing drum shown in Fig. 1.

Fig. 6 is a view partly in elevation and partly in vertical section of dual propulsion rotors.

Fig. 7 is a plan view of a sheet reinforced without the aid of pulling pellets.

Fig. 8 is a plan view of a sheet reinforced with the aid of pulling pellets.

Referring to the drawings more specifically by reference characters:

As shown in Fig. 1, the rotor consists of an outer annular ring or liner 1 enclosing an inner annular ring 2, both being held in fixed relation. The rotor rotates about a shaft 3 which is maintained in a stationary position by the side walls of the casing 4. The outer ring is equipped with pockets 5 and passages 6 which connect with radial openings 7 in the inner ring, and the said openings connect through suction and pressure ports 8 and 9, respectively, with suction and pressure pipe connections 10 and 11, respectively.

The lower part of the casing forms a hopper 12 for the pulling pellets 13; and the former is equipped with an air inlet 14, check valve 15, check valve cage 16, and flexible strips 17, to prevent removal of air from the upper part of the casing. The top of the latter forms a tubular sleeve 18 whose longitudinal axis is tangential with the periphery of the rotor. One end of the sleeve encloses the outer end of an extruding device 19 through which the fibre-forming material 20 is extruded in finely divided streams by screw 21 as the material is brought to fluidity by heating coils 22, and these extruded streams are attenuated into filaments 23 by pull of the pellets. The other end of the sleeve is equipped with a flexible connection 24 to permit movement of the gun barrel 25.

Figs. 2 to 4 show the driving arrangement for the gun. The rotor is driven by means of a belt 26 from a source of power not shown. This belt travels in groove 27 of the rotor hub 28 which extends through one side of the casing. Belt 29 is conveyed by a second groove 30 in the rotor hub and serves to drive a pulley 31, and the latter rotates the cam 32 through the shaft 33. The shaft turns in bearings in the ribs 34 which are attached to the side of the rotor casing. A pin 35 driven into the under side of the gun barrel travels in the groove 36 of the cam, and the travel of this pin results in the barrel reciprocating laterally at a uniform rate of speed. Obviously, by suitably varying the depth and pitch of the groove and the rotative speed of the cam, the muzzle of the gun can be made to move through an endless circuit in any predetermined direction and at any desired speed.

The reinforcing apparatus, as shown in Fig. 1, consists of a closed drum 37 heated by steam or other fluid entering hollow shaft 38, openings 39 therein leading into the chambers 40 between the arms 41. Roll 42 consists of two sheets 43 and 44 wound thereon which are carried over the drum under calender rolls 45 and 46, through temperature regulating chamber 47 having fluid outlets 48 and inlets 49, and the sheets are finally separated and wound upon rolls 50 and 51. Filaments are deposited directly on the drum just above calender roll 52 from a primary spinning gun, and also on the sheeting below roll 45 by a secondary spinning gun.

As shown in Fig. 5, fluid sheeting may be fed from feed pipes 53 and 54 through knife-like slots 55 and 56, respectively, onto the drum described above. The orifices of the feed pipes should be at some distance from the drums, the feed should reach the drum tangentially to the movement of its periphery, and the peripheral speed of the drum should be greater than the extrusion speed so that the fluid sheets will be sufficiently stretch-oriented and thinned into films for the purposes desired. If greater strength is required than that supplied by the reinforcing filaments additional fibrous material, such as staple glass fibres, can be introduced to the propulsion stream by way of ejector 60 having an outlet 61 and an inlet 62, as shown in Fig. 3.

Fig. 6 shows a two rotor propulsion arrangement. The left hand rotor is of the same construction and arrangement as that shown in Fig. 1, except that passages 63 have no peripheral pockets, and the frictional contact of a filament pulled by a much greater arc of a nonadhesive, or slightly adhesive, surface is sufficient to attenuate the stream 20 into a filament without aid from an adjacent rotor. The latter consists of rings 64 and 65 similar to those of the primary rotor, and the former ring is equipped with passages 66. When advisable, the nip of the two rotors can be used to pull filaments contacting either or both of the rotors at other points than those shown, as when a stream of fibre-forming material enters the casing 67 in axial alignment with the gun barrel. The primary or left hand rotor is driven as in Fig. 1, and the secondary rotor is driven by the primary rotor through a crossed belt 68.

Fig. 7 indicates a sheet einforced by filaments deposited promiscuously without the aid of pulling pellets, but which has uniform strength due to regular and continuing redirecting movements of the gun barrel.

Fig. 8 indicates the uniformity of the spacing of the filaments as the latter is deposited in wavy lines and bonded by the pellets to the sheet being reinforced.

The operation of the apparatus described above has been indicated in part in connection with the foregoing description. The following examples will more completely illustrate the methods that can be used in the practice of my invention.

Example I

Reinforcement of an aluminum foil is accomplished by depositing polyamide filaments, attenuated with the aid of polyethylene pellets, over the foil, and bonding the filaments to the foil by reducing the pellets to an adhesive condition by heat and pressure, as shown in Fig. 1.

Passage of air through hopper 12, pockets 5, air passages 6 and 7, port 8, and suction outlet 10, results in one or more pellets about $\frac{1}{16}$ inch in dia. filling each pocket as the periphery of the rotor passes over hopper 12. The passages 6 are smaller than the pellets, and consequently the latter are held in the pockets under a differential pressure as long as the passages are connected to the suction port 8. Polyamide material having a molecular weight of about 20,000 is brought to fibre-forming fluidity at 300° F. by coils 22 and extruded in finely divided adhesive streams 20 by the extrusion screw 21. Extrusion is tangential to the movement of the periphery of a rotor 18 inch in dia. and rotating at 5 to 10 R. P. M., and rotation of the latter results in contact being made between a fluid stream and a pellet, or a plurality of streams and an axial row of pellets. Adherence between a stream and a pellet and a lesser adherence between the stream and the polytetrafluoroethylene coated liner 1, results in a positive pulling and attenuation of the stream 20.

The attenuation of a fluid stream 20 into a filament by positive pull of a pellet, with or without adherence of the stream to the periphery of the pocket liner, is continued until a pellet pocket passage opens to port 9 and pressure connection 11, whereupon the pellet is propelled from its pocket by a blast of air at room temperature and 10 lbs. pressure. This cold-draws the filament and strips it from the periphery arc back to the next pellet at which point the elastic limit of the filament will have been reached and it will break, providing the pellet has been shot a reasonable distance, as for instance, ten to twenty feet for a filament $\frac{1}{32}$ inch dia. at its point of contact with a pellet conveyed in a pocket spaced 3½ inches from a succeeding pocket. Or if a filament has not reached its elastic limit, or at least a portion of it is maintained in an adhesive condition by using steam or other propulsion fluid at a temperature of 300° F., a string of pellets can be propelled through the gun barrel in a continuous succession, uniformly spaced on an unbroken filament. Size of fibre stream, temperature and pressure of propulsion fluid, and distance the pellets are propelled may all vary within wide limits to give continuous or discontinuous filaments.

The propulsion of the pellets is through the gun barrel 25, the axis of which is tangential to the movement of the periphery of the rotor. The barrel is hinged or otherwise flexibly connected with the rotor casing so that the muzzle of the former may be continuously moved back and forth, or through an endless circuit, during deposition of the filaments. This results in the filaments being deposited in a uniformly spaced and intersecting condition, as shown in Fig. 8.

Aluminum foil 43 of .0005 inch in thickness, supported by a backing or supporting fabric 44, is conveyed over a deposition drum 37, whose periphery travels at the rate of 30 to 40 feet per min., and which is heated internally by steam at a temperature of 230° F. entering hollow shaft 38 and passing through openings 39 into the chambers 40. At this temperature the pellets soften and become adhesive, without any softening and resulting loss of stretch-orientation to the polyamide filaments, and are thinned out by roll 45 under light pressure of about 25 lbs. per square inch to form a continuous coating or bonding web over the foil of .001 inch in thickness which encloses and bonds the filaments to the foil. After moving under roller 46 the reinforced foil is conveyed through a treating chamber 47 where the filaments and coating are set by cold air entering the chamber through inlets 49, passing counter to the movement of foil, and leaving by outlets 48. The reinforced foil is then stripped from its supporting fabric, the former wound upon roll 50, and the latter upon roll 51.

Sometimes it is advisable to dispense with the backing or supporting fabric and reinforce a plurality of foils simultaneously. Two thin foils 43 and 44 in supporting face to face contact may be run from roll 42, both reinforced by filaments, and the two reinforced foils stripped apart and rewound by rolls 50 and 51. In this case, a primary spinning gun deposits filaments on the drum which are calendered thereto by roll 52 and contact the underside of foil 44, and a secondary spinning gun deposits filaments on the upper side of foil 43. The said filaments from the two guns are bonded by their respective pellets to opposed surfaces of the double foil by heat from the drum and pressure from the rolls 45 and 46, the nonadhesive characteristics of the polytetrafluoroethylene coated drum preventing adhesion thereto of the primary filaments.

Foils, films, tapes, paper, cloth, and sheeting of other materials, can be reinforced by filaments on one or both sides as just described; or the filamentary web can be interposed between the webs to be reinforced by running the latter onto the drum, one prior and one subsequently to the deposition of the filaments. Obviously, a laminated structure can be built up by depositing the webs to be reinforced and the reinforcing webs in succession one upon the other.

If the heat sealing temperature of a film to be reinforced is below the softening point of the filaments, the temperature of the calender roll 45 and depositing drum can be maintained at a sufficiently high temperature to heat-seal the film to the filaments. For instance, a temperature of 220° F. can be maintained to heat-seal a polyethylene film to polyamide filaments whose softening point is 275° F. Or set and cold-drawn polyamide filaments can be bonded to a film or other sheet by coating the filaments or sheeting prior to contact with a suitable adhesive. This may be a polymerizable resin in a volatile solvent, such as a mixture of polyvinyl acetate and glyptol dissolved in acetone, which can be applied to the filaments as a spray coating by the ejector 60, as shown in Fig. 3, and the heat of the calender roll 45 and drum will serve to evaporate the solvent after the bonding has been accomplished. In such instances, the pulling pellets can be removed from contact with the filaments by explosion, evaporation, or other disintegration, as described in my U. S. Patent No. 2,687,363.

Obviously most films can be cast directly upon the drum. For instance, a vinyl chloride-acetate resin can be extruded from a pressure-hopper 53 through a knife slot 55 onto the drum, as shown in Fig. 5. If the extrusion speed is 3 ft. per min., the peripheral speed of the drum may be about 45 ft. per min. to draw the resin down to a continuous film coating of 3 mils in thickness. A similar resin can be extruded at the same rate of speed from hopper 54 through knife slot 56, and both films calendered by roll 46 with the filaments bonded therebetween by the adhesiveness of the polyethylene pellets, whose adhesive temperature is below that of both vinyl sheets and filaments.

*Example II*

Paper for packaging purposes can be reinforced by filaments spun from a copolymer of vinyl chloride and vinyl acetate in the proportion of 90 per cent of the former to 10 per cent of the latter. The copolymer can be attenuated into stretch-oriented filaments with the aid of pellets of the same material in the apparatus of Fig. 1, as described in Example I.

The resin is dissolved in acetone to yield a viscous spinning dope containing about 25 per cent by weight of resin. The pellets are about 1/16 inch dia. and are carried forward through the stretching barrel by a blast of warm air which also serves to evaporate a portion of the solvent. The filaments and pellets are deposited in a tacky condition on paper 43 as the latter is carried from roll 42 over the drum 37, which preferably is entirely enclosed in a solvent recovery chamber having a flexible filament inlet opening to which the gun muzzle is attached.

The drum is maintained at a temperature of about 230° F. and travels at a sufficient speed to tension and increase the attenuation of the filaments as they are deposited. At this tension, speed, and temperature, and under light pressure from the calender roll 45, the filaments are bonded at wide spacing to the paper, the pellets are thinned out to the thickness of the filaments, the flattened pellets are bonded to the paper, and the solvent is evaporated by the said heat. The paper is thereby given a much stronger reinforcement from the stretch-oriented filaments and with less material than could be obtained from an ordinary film coating.

*Example III*

A strong, waterproof, insulating paper for packaging purposes can be manufactured from glass filaments, stretch-oriented by the pull of micaceous mineral, and deposited and bonded by asphalt between two sheets of kraft paper, substantially as shown in Fig. 1.

Finely divided glass streams at a temperature between 1900° F. and 2100° F. are extruded from a device 19, or flows from a depending boot of a glass furnace, to come in contact with expanded vermiculite solids 13 of about 1/4 inch in dia. in the pockets of the rotor. The rotor and associated parts are made of heat resisting metal, such as a nichrome alloy, and the casing and gun barrel are lined with refractory material. The surface of the rotor travels at a peripheral speed of 50 ft. per min., and after attenuating the finely divided streams of glass into filaments by a positive pull, the solids are propelled by superheated steam at a pressure of 150 lbs. per square inch which gives the solids a high initial velocity and also sets the filaments.

Kraft paper is fed from a roll 42 onto the depositing drum 37 where it is coated with cementing asphalt at a temperature between 220° F. and 250° F. from a spreading device, similar to 53 in Fig. 5, before contact with the filaments and their vermiculite pulling solids. The calender roll 45 and drum are heated through their annular shafts by steam at a temperature of 300° F., and by heat and pressure therefrom the glass filaments and solids are bonded by the asphalt to the kraft paper, as indicated in Fig. 8. When desirable, a secondary sheet of kraft paper may be fed from a roll, similar to 42, over the glass reinforcing web between the heated calender rolls 45 and 46. The several webs are then calendered by roll 46 under pressure and heat similar to that exerted by roll 45.

In the present example, the vermiculite has been expanded in a prior operation and is easily flattened under a low pressure. The temperature of the gun barrel is maintained sufficiently high by the 150 lbs. steam pressure to deposit the filaments as continuous threads connected to a source of supply. However, unexpanded micaceous mineral may also be used as the pulling solids, and the mineral expanded or exfoliated during passage through the gun barrel. Perlite, expanded or unexpanded, can be used in similar fashion. Other heat resistant solids that may be used to pull the filaments are: staple glass fibres of higher softening temperature than the filaments, asbestos fibres, metallic flakes, and mixtures thereof.

*Example IV*

Pressure-sensitive, heat-sensitive, and solvent-sensitive tapes can all be produced in the apparatus of Fig. 1 in somewhat similar manner to that described in Example I.

A polyethylene film 43 in Fig. 1 of .002 inch in thickness is backed by a cloth 44 and carried over drum 37 rotating at a peripheral speed of 30 to 40 ft. per min. The polyamide filaments are pulled by pellets of latex in mixture with polyvinyl acetate, and are subjected to heat of 200° F. from the drum and light pressure from roll 45. This softens the pellets and spreads them in a continuous pressure-sensitive coating over the polyethylene film thereby enclosing and bonding the filaments to the film without loss of stretch-orientation to the filaments. After passing under roll 46 and through the setting chamber 47, the tape may be stripped from its backing if desired, and tape and backing wound upon rolls 50 and 51, respectively.

In similar manner, can a much thinner tape be produced by substituting for the above film a polyester film of .00025 inch in thickness, made with ethylene glycol and terephthalic acid, which film can readily be laminated to aluminum foil or kraft paper. Or a polyester-glass tape can be made by producing the glass filaments of Example III at a temperature of 1900° F., pulled by short 3/4 inch length glass fibres whose adhesive temperature is above 2000° F., and depositing both in a set condition on a polyester film from roll 42. The said filaments and fibres can then be bonded to the film by the above-mentioned elastomer-resin adhesive extruded onto the film from a pressure hopper 53, positioned between the film roll and the point at which the said filaments and fibres are deposited. On the polyester, in an incompletely polymerized and thermoplastic condition can be extruded in a film from hopper 53 directly onto the drum, and the said filaments and fibres bonded thereto, and the film set by heat and pressure from the drum and calendar roll 45. A pressure hopper 54, positioned between the two rolls 45 and 46, would then be used to coat the reinforced film with a pressure-sensitive adhesive.

*Example V*

Roofing, siding and similar waterproof, weather-resistant articles can be manufactured from asphalt impregnated paper of felt, reinforced in somewhat similar fashion to that shown in Fig. 1 and described in Example III.

Glass filaments are attenuated by the pull of expanded or unexpanded perlite or micaceous material, staple glass fibres, metallic flakes, or asbestos, and the filaments with pulling solids are deposited and bonded to a paper or felt unwound from roll 42 and impregnated by heated asphalt from pressure hopper 53 positioned between the roll and the drum.

Or polyamide filaments can be produced as in Example I, but with the aid of asphalt pulling pellets that will pass through a 10 mesh screen. The pellets upon deposition can be thinned out by heat of 225° F. and pressure from roll 45 and drum to coat and impregnate a paper from roll 42 and enclose and bind the filaments to the paper. The result will be a light weight waterproof paper of great strength.

To bond the sheets together and to a roof decking or other surface in structural work, a brush coating of a solvent for the bitumen impregnant in the felt will enable the treated sides of the layers to be cemented together and to the receiving surface as the fabric is laid down. The solvent may be volatile, such as petrol; or it may be nonvolatile, such as creosote.

Obviously, a coating for roofing and siding can be produced at the time and place required. A gun, such as shown in Fig. 1 and described in Example I, can be used to produce and spray polyamide filaments, pulled by bituminous pellets, directly over the surface to be coated. For such operations, a gasoline heated hand roller can be used to heat and thin out the pellets to form a continuous, waterproof coating enclosing the filamentary reinforcement. And, if desired, perlite, asbestos, metallic flakes, staple glass fibres, or micaceous mineral, can be introduced in the filamentary propulsion stream by means of the ejector shown in Fig. 3, and such solids incorporated in the said coating.

*Example VI*

A rotor, or rotors, similar to that shown in Fig. 1 and described in Example I, may also be used for the propulsion of filaments without the aid of pulling pellets, as shown in Fig. 6.

A moderately adhesive contact with an arc of a polytetrafluoroethylene coated rotor, traveling at a much higher speed than the extrusion speed of finely divided fluid streams of a polyamide fibre-forming material, attenuates the streams into filaments. These are blasted from the rotor by force of an air stream from slots 63 placed at an acute angle, and as nearly parallel as possible, with the axis of the gun barrel. A secondary rotor, with similar but opposed slots, cooperates with the primary rotor to aid in propelling the filaments by a blast from slots 66. Or both of the rotors may be coated with polytetrafluoroethylene resin to make them nonadherent to the said fluid streams, and the latter positively pulled by the grip of the rotors.

In either of the above cases, if the air stream is at room temperature, the filaments can be cold-drawn, propelled and deposited for comparatively short distances as continuous filaments without loss of stretch-orientation gained by attenuating the said fluid streams into filaments; if steam at 500° F. is used for propelling purposes the filaments can be disrupted at their point of propulsion into discontinuous filaments, and deposited on the sheet in a promiscuous and adhesive condition, as indicated in Fig. 7.

All thermoplastic fibre-forming materials can be positively pulled and blasted into discontinuous adhesive filaments by carefully regulating the temperature and pressure of the propulsion fluid. In such cases, the gun barrel should be shortened and an ejector, such as 60 in Fig. 3, slipped thereover. Propulsion of the filaments within an annular column of higher pressure air or steam supplied through connection 62 will prevent adherence of the filaments to either barrel. And, of course, both barrels can be coated with an antiadhesive such as polytetrafluoroethylene.

It will be evident from the foregoing examples that all materials used in the manufacture of films that are strengthened by molecular stretch-orientation can also be drawn into stretch-oriented filaments from a molten, solution, or other condition; all such materials can also be produced in discrete pellets, fibres, or other solid form that can be used to aid in the attenuation of similar materials, or materials of higher softening point, into filaments of greater strength and length than can be produced by elastic fluid propulsion without their pulling aid; and pulling solids of one thermoplastic material can be rendered adhesive and used to bond the filaments of another thermoplastic material at a temperature below the softening point of the filaments, the said softening point being defined as that point at which a filament begins to lose its stretch-orientation.

Fibres of a lower adhesive temperature than the reinforcing filaments or the film to be reinforced, can also be used as the pulling solids. For instance, polyethylene fibres, whose adhesive temperature is 230° F., can be used to pull polyamide filaments, whose softening point is 275° F., at a propulsion fluid temperature of 200° F.; and the said fibres can then be used to bond the filaments at a calendering heat of 230° F. to an aluminum foil whose melting temperature is 1200° F. The momentary contact of a polyamide molten fluid stream with a pellet or fibres immediately before propulsion of the latter does not reduce the pellet or fibres to a fluid state or destroy their function to aid in stretching a filament, providing the temperature of the propulsion fluid is below the melting point of the said pellet or fibres.

Therefore, to obtain maximum reinforcing strength the stretch-orientation gained by pull of the pellets must not be lost by heat or otherwise during the bonding of a web of filaments to the web being reinforced. In other words, the filaments must be bonded at their maximum pellet-pulling stretch which preferably is increased during deposition of the filaments by the transverse movement of the gun barrel over a web to be reinforced moving in an opposed direction until finally the maximum strength and elastic limit of the filaments have been reached. Or, if a film requires to be stretched a given amount, as in packaging certain products, it can be reinforced with filaments whose cold-drawing has been limited to permit the predetermined stretch.

It will again be evident that the propulsion force and temperature within the gun barrel may be so regulated that a pellet can be propelled a substantial distance and the filament remain in a sufficiently softened and adhesive condition, or it may be cold-drawn within its elastic limit, and there will be no break in the filament before propulsion of a succeeding pellet, thus producing a continuous filament to which is attached a discrete solid at regular and predetermined intervals. Or the filament may be cold-drawn by one pellet beyond the elastic limit of the filament, and the break will usually occur at its connection to a succeeding pellet, thus producing a discontinuous filament of predetermined length to which a pellet is attached in predetermined relation.

It will furthermore be evident that pulling pellets can be so regulated as to size and spacing on a contacting wall, and the distances and directions they are to be propelled from the wall so controlled that they can be deposited with great uniformity and varied spacing, and the filaments will have a predetermined stretch; and when the pellets are subjected to heat and pressure to bond a filamentary web to a web to be reinforced, the pellets may be thinned out to produce an impervious bonding web over, or fill the interstices of, the reinforcing web, or the filaments of the web may simply be bonded by the pellets in spots of predetermined spacing.

It is therefore evident that foils, films, tapes, paper, cloth, felt, roofing, and other sheeting materials can be greatly strengthened if laminated to webs of stretch-oriented filaments, the said filaments preferably bonded to the said sheeting while tensioned at their maximum stretch, and the sheeting will have uniform strength in all directions. And if a reinforced sheet requires a coating to reduce its vapor-transmission rate, or for other reasons, the coating can still be applied by solution spreading and/or calendering with the reinforcing web incorporated therein, and without loss of stretch-orientation to the filaments that make up the web.

I claim as my invention:

1. A new article of manufacture comprising a sheet of material reinforced on at least one side by a plurality of spaced, stretch-oriented filaments, the said filaments being bonded in a succession of overlaps to the said sheet by discrete solids without loss to the filaments of their stretch-orientation to give the sheet substantially uniform strength in all directions in a two-dimensional plane.

2. The article of claim 1 in which the said filaments are cold-drawn to give the said sheet a predetermined extensibility.

3. The article of claim 1 in which the said solids are distorted to enclose at least a portion of each of the said filaments without any substantial distortion of the filaments.

4. In a method for distributing pellet-entrained filaments by the propulsion of the said pellets in a controlled path, the improvement of continuously flexing the said path during the said propulsion.

5. In a method of reinforcing an article by pellet-entrained filaments deposited in contact therewith, the improvement of claim 4 including the additional step of calendering the said pellets to enclose at least a portion of the said filaments and bond them in predetermined relation to the said article.

6. In an apparatus having a casing and means within the casing for propelling pellet-entrained filaments therefrom by propulsion of the said pellets, the combination of: a propulsion barrel flexibly attached to the said casing through which the said pellets are propelled; and means for continuously flexing the said barrel during the said propulsion to distribute the said pellet-entrained filaments.

7. In a method for reinforcing an article by filaments deposited in contact therewith, the steps comprising: adherently contacting fibre-forming material with discrete solids upon a supporting wall moving through an endless circuit; propelling the said adherent solids from the said wall by force of a fluid stream so directed as to attenuate the said material tangentially to the said movement of the wall into filaments of substantial length and strength; and bonding the said filaments by heat and pressure to the said article.

8. The method of claim 7 in which the said solids are potentially adhesive fibres.

9. The method of claim 7 in which the said solids are calendered and thinned out to form a film coating for the said filaments and bond them to the said article.

10. The method of claim 7 in which the said filaments are bonded to the said article without loss of their stretch-orientation.

11. The method of claim 7 in which the said material is reduced to fibre-forming fluidity by a solvent, and the said filaments set and solvent evaporated by the said heat.

12. In an apparatus for attenuating fibre-forming material into filaments by the propulsion of discrete solid material adherent therewith, the combination of: a supporting wall adapted for movement through an endless circuit; a casing enclosing the said wall; a propulsion barrel attached to the said casing and whose axis is in a substantially tangential alignment with the said movement; means for depositing one of the said materials on the said wall; means for moving the said wall to bring the said materials into adherent contact; and means for propelling the said solid material with an adherent portion of the said fibre-forming material through the said barrel during the said movement of the wall to attenuate the fibre-forming material into a continuous succession of filaments.

13. The apparatus of claim 12 in which the said propulsion means is a fluid that passes through the said wall.

14. The apparatus of claim 12 in which the said barrel is flexibly connected to the said casing, and including means for continuously redirecting the said barrel to distribute the said filaments.

References Cited in the file of this patent

UNITED STATES PATENTS

| | | |
|---|---|---|
| 2,444,115 | Reed | June 29, 1948 |
| 2,476,283 | Castellan | July 19, 1949 |
| 2,637,673 | Barnard | May 5, 1953 |
| 2,687,363 | Manning | Aug. 24, 1954 |